(12) United States Patent
Warke et al.

(10) Patent No.: US 7,194,024 B2
(45) Date of Patent: *Mar. 20, 2007

(54) METHOD FOR ADAPTIVE HYBRID SELECTION DURING ADSL MODEM TRAINING

(75) Inventors: Nirmal C. Warke, Irving, TX (US); Susan Yim, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 675 days.

This patent is subject to a terminal disclaimer.

(21) Appl. No.: 10/354,225

(22) Filed: Jan. 29, 2003

(65) Prior Publication Data

US 2004/0146096 A1     Jul. 29, 2004

(51) Int. Cl.
*H04B 1/38* (2006.01)
(52) U.S. Cl. .................................... 375/222
(58) Field of Classification Search ................ 375/222
See application file for complete search history.

(56) References Cited

U.S. PATENT DOCUMENTS

| | | | | |
|---|---|---|---|---|
| 4,246,582 A | | 1/1981 | Kondo et al. ................. 370/32 |
| 4,785,465 A | | 11/1988 | Lang et al. ..................... 375/7 |
| 4,805,215 A | * | 2/1989 | Miller .................... 379/406.08 |
| 5,416,776 A | | 5/1995 | Panzarella et al. ........ 370/85.11 |
| 5,506,868 A | | 4/1996 | Cox et al. ................... 375/222 |
| 5,572,517 A | | 11/1996 | Safadi .......................... 370/50 |
| 5,623,514 A | * | 4/1997 | Arai ........................... 375/222 |
| 5,696,765 A | | 12/1997 | Safadi ........................ 370/436 |
| 5,764,694 A | * | 6/1998 | Rahamim et al. ........... 375/224 |
| 5,802,169 A | | 9/1998 | Frantz et al. ................ 379/398 |
| 5,999,540 A | | 12/1999 | McGhee ..................... 370/465 |
| 5,999,565 A | | 12/1999 | Locklear, Jr. et al. ....... 375/222 |
| 6,021,158 A | | 2/2000 | Schurr et al. ............... 375/211 |
| 6,101,216 A | | 8/2000 | Henderson et al. ......... 375/222 |
| 6,160,843 A | | 12/2000 | McHale et al. ............. 375/222 |
| 6,163,579 A | | 12/2000 | Harrington et al. ......... 375/257 |
| 6,185,280 B1 | * | 2/2001 | Jarboe et al. .................. 379/3 |
| 6,192,109 B1 | | 2/2001 | Amrany et al. ............... 379/30 |
| 6,208,732 B1 | * | 3/2001 | Moschytz et al. .......... 379/402 |
| 6,295,343 B1 | | 9/2001 | Hjartarson et al. ...... 379/93.05 |
| 6,385,203 B2 | | 5/2002 | McHale et al. ............. 370/401 |
| 6,385,252 B1 | | 5/2002 | Gradl et al. ................ 375/257 |
| 6,400,772 B1 | | 6/2002 | Chaplik ...................... 375/258 |
| 6,483,870 B1 | | 11/2002 | Locklear, Jr. et al. ....... 375/222 |
| 6,724,890 B1 | * | 4/2004 | Bareis ........................ 379/394 |
| 6,795,405 B1 | * | 9/2004 | Mladenovic et al. ....... 370/286 |
| 6,996,200 B2 | * | 2/2006 | Schubert et al. ............ 375/355 |
| 2001/0048716 A1 | * | 12/2001 | Gough et al. ............... 375/222 |

OTHER PUBLICATIONS

ANSI, "T1.413 (1998) draft standard", Dec. 1998, pp. 137-140.*

* cited by examiner

*Primary Examiner*—Temesghen Ghebretinsae
*Assistant Examiner*—Juan Alberto Torres
(74) *Attorney, Agent, or Firm*—Steven A. Shaw; W. James Brady; Frederick J. Telecky, Jr.

(57) ABSTRACT

The methodology accomplishes adaptive hybrid selection during ADSL modem training. The adaptive hybrid selection method maximizes performance for ADSL modems in the presence of various impairments on the line by optimally selecting the appropriate hybrid based on line conditions. Specifically, the adaptive hybrid selection method is based on a measure directly coupled to the channel capacity.

5 Claims, 1 Drawing Sheet

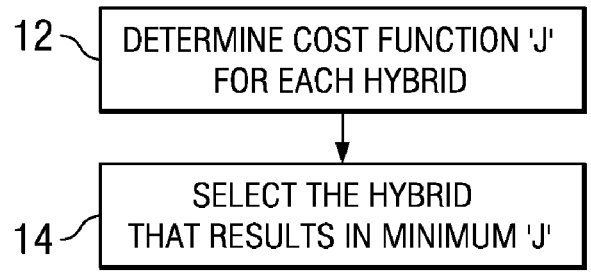
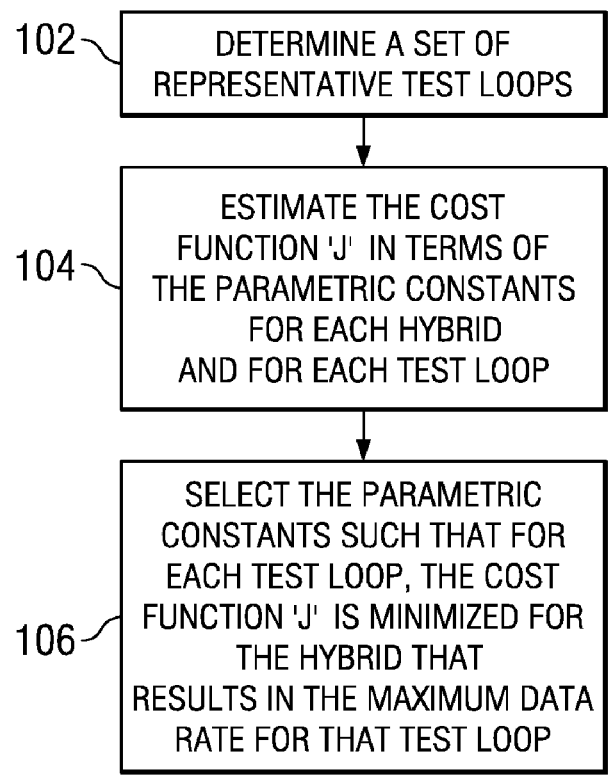

METHOD FOR ADAPTIVE HYBRID SELECTION DURING ADSL MODEM TRAINING

BACKGROUND

1. Field

This invention relates generally to Asymmetric Digital Subscriber Line (ADSL) modems, and more particularly to a method of adaptive hybrid selection during ADSL modem training.

2. Description of the Prior Art

The hybrid is an analog electrical network (part of the analog front end-AFE) in the modem that is responsible for 2 to 4 wire conversion i.e., the hybrid allows the transmit signal from one pair of the 4-wire side (transmit) to pass directly on to the 2-wire side (subscriber loop) and at the same time suppresses the transmit signal component on the other pair of the 4-wire side (receive). Ideally, the hybrid should completely suppress the transmit energy on the receive wire pair. However, in reality since the line impedance changes from one loop to the next, the hybrid can only be designed to match an "average" loop impedance. In many cases, with bridge taps, HPNA devices and other devices on the line, the loop impedance can change substantially from the nominal value. In these cases, the hybrid is mismatched to the line and the transmit energy can completely dominate the receive signal and receive performance suffers. In order to reduce the effect of hybrid mismatch on receive performance, often multiple hybrids are designed into the modem. The important task then becomes one of selecting the hybrid that maximizes receive performance.

It would therefore be desirable and advantageous in view of the foregoing to provide a methodology for adaptive hybrid selection based on the estimated noise floor during regular ADSL modem initialization.

SUMMARY OF THE INVENTION

The present invention is directed to a methodology for adaptive hybrid selection during ADSL modem training based on the estimated noise floor during regular ADSL modem initialization. The adaptive hybrid selection method maximizes performance for ADSL modems in the presence of various impairments on the line by optimally selecting the appropriate hybrid based on line conditions. Specifically, the adaptive hybrid selection method is based on a measure directly coupled to the channel capacity.

A method according to one embodiment of the invention comprises the steps of determining a set of N representative test loops; defining a first parametric cost function directly coupled to channel capacity; evaluating the first cost function in terms of the cost function parameters for each hybrid in response to estimated noise floors associated with each hybrid for each representative test loop; determining the optimum values of the cost function parameters to maximize the data rate for each test loop by selecting the hybrid resulting in the minimum first cost function value associated with a selected subscriber loop; and using the optimum parameters estimated as above in the cost function during ADSL modem training to determine the best hybrid to select for each training attempt by choosing the hybrid that results in the minimum value for the cost function.

BRIEF DESCRIPTION OF THE DRAWINGS

Other aspects and features of the present invention and many of the attendant advantages of the present invention will be readily appreciated as the same become better understood by reference to the following detailed description when considered in connection with the accompanying drawing wherein:

FIG. 1 is a flowchart depicting a method for adaptively selecting a hybrid based on a measure (cost function) 'J' during ADSL modem training and that is directly coupled to the channel capacity according to one embodiment of the present invention; and FIG. 2 is a flowchart depicting a method of determining the empirical constant parameters of the cost function 'J' shown in FIG. 1.

While the above-identified drawing figure sets forth particular embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

A method 10 is shown in the FIG. 1 for adaptively selecting the hybrid based on a measure 'J' during ADSL modem training and that is directly coupled to the channel capacity. During ADSL modem training the cost function J is evaluated for each hybrid position as seen in block 12, and the hybrid corresponding to the minimum value of J is selected as seen in block 14. According to the most preferred embodiment that is discussed herein, the cost function 'J' is given by, $$J = A * \sum_{i \in S} \log_2(\text{nf\_quiet}(i)) + B * f(\text{nf\_echo}),$$

where

A and B are empirical constants estimated based on the performance of the different hybrids over a set of representative test loops. An exact procedure for determining these constants is described later with reference to FIG. 2.

"nf_quiet(i)" is the estimated quiet noise floor for tone index-i with no transmit signal. It is estimated as $$\text{nf\_quiet}(i) = \frac{1}{N} \sum_{f=1}^{N} |Y^f(i)|^2,$$

where $Y^f$ is the Fast Fourier Transform (FFT) of the $f^{th}$ received Discrete Multi-Tone (DMT) frame and $Y^f(i)$ is the value of $Y^f$ at tone index-i. The quiet noise floor for an ADSL Customer Premises Equipment (CPE) modem can be reliably estimated over 64 DMT frames during the first 512 frames of R-REVERB1 during which the CPE modem is transmitting the REVERB signal and receiving a QUIET signal. The hybrid selection importantly must be done early on in the training before the Automatic Gain Control (AGC) settings are decided. Since the transmit and receive of the modem are completely synchronized, estimating "nf_quiet(i)" over the non-overlapping receive band while transmitting the REVERB signal is equivalent to estimating it while transmitting a QUIET signal.

The set "S" for summation of the "nf_quiet" noise floor is a part of the receive band. For an ADSL CPE modem, this can be chosen to be S={37, 38, . . . , 119}.

The "nf_echo" term is the sum of the echo signal power over the transmit band. It is determined as follows:

$$\text{nf\_echo} = \prod_{i=\text{TX\_start}}^{\text{TX\_end}} \text{nf\_echosignal}(i)$$

and $$\text{nf\_echosignal}(i) = \frac{1}{N} \sum_{f=1}^{N} |Y^f(i)|^2,$$

where TX_start and TX_end are the start and end of the transmit signal. For an ADSL CPE modem, this could be TX start=6 and TX end=31.

As in the case of "nf_quiet", "nf_echo" can be reliably estimated over 64 received DMT frames during the first 512 frames of R-REVERB1 for an ADSL CPE modem.

The function "f(nf_echo)" is the effect of the transmit signal echo on the channel capacity. According to one embodiment of the present invention, this can be chosen to be the "log" function.

The cost function 'J' is evaluated for each hybrid (based on the estimated noise floors for each hybrid). As stated herein above for an ADSL CPE modem, 64 DMT frames are sufficient for a reliable estimate of the "nf_quiet" and "nf_echo" noise floors for each hybrid. Further, some amount of "settle" time for the relay/switch to settle must be given, where 5 milliseconds of settle time is believed by the present inventor to be sufficient in most cases. The hybrid that results in the minimum value of 'J' is then chosen for that particular loop.

An important task is to determine the weighting constants "A" and "B" of the cost function 'J', as one method 100 shows in FIG. 2, for best performance across all possible loops for the particular switchable hybrid architecture. As seen in block 102, a set of representative test loops is first determined. Next, the cost function 'J' is estimated in terms of the parametric constants for each hybrid and for each test loop as shown in block 104. Finally, as shown in block 106, the parametric constants are selected such that for each test loop, the cost function 'J' is minimized for the hybrid that results in the maximum data rate for that test loop. A more detailed methodology for doing this according to one embodiment comprises the following steps:

First, determine a set of N representative test loops. For example, the test loops specified in the ADSL standards can be chosen.

Second, for each test loop, estimate the values of $$J1 = \sum_{i \in S} \log_2(\text{nf\_quiet}(i)) \text{ and } J2 = f(\text{nf\_echo})$$

for each hybrid (assume M hybrids). In order to do this, nf_quiet(i) and nf_echo(i) must be estimated. This can be done as specified in the previous section.

Third, for each test loop#k, determine the modem connect rate R(n,k) with each hybrid#n. Based on the connect rate, determine the best hybrid n0=n0(k) for each test loop.

Fourth, let J1(n,k) denote the value of J1 for hybrid#n and test loop#k. Similarly, define J2(n,k) as the value of J2 for hybrid#n and test loop#k.

Fifth, form the following cost function:

$$H(A, B) = \sum_{k} \sum_{n! = n0} \text{Sign}[J(n, k) - J(n0, k)] * \frac{(R(n0, k) - R(n, k))}{R(n0, k)}$$

$$= \sum_{k} \sum_{n! = n0} \text{Sign}[A * (J1(n, k) - J1(n0, k)) + B *$$

$$(J2(n, k) - J2(n0, k))] * \frac{(R(n0, k) - R(n, k))}{R(n0, k)}$$

$$= \text{Sign}(A) * \sum_{k} \sum_{n! = n0} \text{Sign}[(J1(n, k) - J1(n0, k)) + C *$$

$$(J2(n, k) - J2(n0, k))] * \frac{(R(n0, k) - R(n, k))}{R(n0, k)}$$

where only the sign of A is important and C=B/A.

Sixth, find "A=+/−1" and "C=real number" to maximize the value of H(A,C). Each term in the above maximization is weighted by the percent difference in data rate. This guarantees that incorrect decisions that result in a substantially lower data rate from the optimal are minimized; and Seventh, for each of the above terms $$C = C(n, k) = -\frac{(J1(n, k) - J1(n0, k))}{(J2(n, k) - J2(n0, k))}$$

will result in that term equal to zero. Hence, sorting the values C(n,k) for all n and k will give (M−1)*N sorted values or (M−1)*N+1 intervals over which the value of the above cost function H is constant (since H is dependent only on the sign of the terms). Evaluate the value of H over each of the (M−1)*N+1 intervals and choose the interval that gives the maximum of the absolute value of H. Then A=(Sign of H) and C=(the mid-point) for the corresponding interval.

As an example for an ADSL CPE modem with multiple hybrids tuned to match the ADSL standard bridged tap test loops, the values of A and B can be chosen to be: A=1, B=3.847.

In summary explanation, a methodology has been described to accomplish adaptive hybrid selection during ADSL modem training. The adaptive hybrid selection process maximizes performance for ADSL modems in the presence of various impairments on the line by optimally selecting the appropriate hybrid based on line conditions.

This invention has been described in considerable detail in order to provide those skilled in the ADSL hybrid art with the information needed to apply the novel principles and to construct and use such specialized components as are required. In view of the foregoing descriptions, it should be apparent that the embodiments of the invention represent a significant departure from the prior art in construction and operation. However, while particular embodiments of the invention have been described herein in detail, it is to be understood that various alterations, modifications and substitutions can be made therein without departing in any way from the spirit and scope of the invention, as defined in the claims which follow. For example, embodiments of the invention shall be understood to using software implementations of the methods set forth in the claims.

What is claimed is:

1. A method of adaptive hybrid selection during modem training, the method comprising:
   determining a set of N representative test loops;
   defining a first parametric cost function directly coupled to channel capacity as $$J = A * \sum_{i \in S} \log_2(\text{nf\_quiet}(i)) + B * f(\text{nf\_echo}),$$

where A and B are empirical constants that are derived based on performance of each hybrid over the set of representative test loops, nf_quiet(i) is the estimated quiet noise floor over the receive band for tone index-i with no transmit signal nf_echo is the sum of the echo signal power over the transmit band, and the set S for summation of the nf_quiet noise floor is a part of the receive band;
   evaluating a cost function 'J' for each hybrid in terms of the cost function parameters for each hybrid in response to estimated noise floors associated with each hybrid for each representative test loop; and
   selecting the hybrid that results in minimum 'J', said selected hybrid to be used by the modem.

2. The method according to claim 1 wherein selecting the hybrid that results in minimum 'J' comprising:
   estimating the optimum values of the cost function parameters to maximize the data rate for each test loop by selecting the hybrid resulting in the minimum cost function value associated with a selected subscriber loop; and
   using the optimum values estimated as above in the cost function during modem training to determine the best hybrid to select for each training attempt by choosing the hybrid that results in the minimum value for the cost function.

3. The method according to claim 1 further comprising estimating nf_quiet(i) as $$\text{nf\_quiet}(i) = \frac{1}{N}\sum_{f=1}^{N} |Y^f(i)|^2,$$

where $Y^f$ is the Fast Fourier Transform of the $f^{th}$ received DMT frame and $Y^f(i)$ is the value of $Y^f$ at tone index-i.

4. The method according to claim 1 further comprising estimating nf_echo as $$\text{nf\_echo} = \prod_{i=\text{TX\_start}}^{\text{TX\_end}} \text{nf\_echosignal}(i),$$

where $$\text{nf\_echosignal}(i) = \frac{1}{N}\sum_{f=1}^{N} |Y^f(i)|^2,$$

and further
where TX_start and TX_end are the start and end of the transmit signal.

5. The method according to claim 1 further comprising:
   estimating for each representative test loop, the values of $$J1 = \sum_{i \in S} \log_2(\text{nf\_quiet}(i)) \text{ and } J2 = f(\text{nf\_echo})$$

for each hybrid;
   determining the modem connect rate R(n,k) with each hybrid for each of the representative test loops;
   determining the best hybrid n0=n0(k) for each loop in response to the modem connect rates;
   defining a second cost function as $$H(A, B) =$$
   $$\text{Sign}(A) * \sum_{k}\sum_{n!=n0} \text{Sign}[(J1(n, k) - J1(n0, k)) + C * (J2(n, k) - J2(n0, k))] *$$
   $$\frac{(R(n0, k) - R(n, k))}{R(n0, k)},$$

where J1(n,k) denotes the value of J1 for hybrid #n and test loop #k, J2(n,k) denotes the value of J2 for hybrid #n and test loop #k, C=B/A and weighting each term in the expression for H(A,C) by the percent difference in data rate;
   determining A=+/−1 and C=real number to maximize the value of H(A,C) as follows;
   sorting the values $$C = C(n, k) = -\frac{(J1(n, K) - J1(n0, k))}{(J2(n, k) - J2(n0, k))}$$

for all n and k to generate (M−1)*N sorted values or (M−1)*N+1 intervals over which the value of the cost function H is constant;
   evaluating the value of H over each of the (M−1)*N+1 intervals and choosing the interval that provides the maximum of the absolute value of H; and
   determining A=(Sign of H) and C=(the mid-point) for the corresponding interval.

* * * * *